3,151,175
HYDRODEALKYLATION OF ALKYLBENZENES
Edwin A. Goldsmith, Oakland, Calif., assignor to California Research Corporation, San Francisco, Calif., a corporation of Delaware
No Drawing. Filed Mar. 8, 1961, Ser. No. 94,134
2 Claims. (Cl. 260—672)

This invention relates to the hydrodealkylation of alkylbenzene hydrocarbons, and, more particularly, to the hydrodealkylation of alkylbenzenes in the presence of a catalyst comprising platinum sulfide disposed on an alumina support.

Present-day refinery processes, for example, catalytic reforming, produce large amounts of alkylbenzene hydrocarbons such as toluene, the xylenes, ethylbenzene, etc. Although these compounds are desirable gasoline components because of their high octane number value, in recent years there has been a considerable increase in demand for them in the relatively pure state for use in the petrochemical industries. However, there has developed a shortage of benzene and processes have been developed commercially for the dealkylation of alkyl aromatics to produce this compound. Since toluene is often produced in quantities in excess of the demand, the dealkylation processes have largely been directed to the demethylation of toluene despite the fact that it is the most difficult alkylbenzene compound to dealkylate. Accordingly, it is an object of the present invention to provide an improved process for the hydrodealkylation of alkylbenzenes, particularly toluene, to produce high yields of dealkylated aromatic hydrocarbons, especially benzene.

The present invention provides a process for the dealkylation of alkylbenzenes which comprises contacting the alkylbenzenes, along with from one to seven mols of hydrogen per mol of alkylbenzene feed, with a catalyst comprising from 0.1–5.0 percent by weight (as the metal) of the total weight of the catalyst of platinum sulfide disposed on an alumina support. The reaction conditions are maintained at superatmospheric pressure and at temperatures of from about 900° to 1250° F.

Except for converting the platinum component of the subject catalyst to the sulfide, the catalyst can be prepared according to any of the numerous methods known in the art for the preparation of platinum on alumina reforming catalysts. One method of preparing the catalyst is to form the alumina by the addition of an alkaline precipitant to a solution of an aluminum salt. The platinum component can be added in a variety of manners, one such being the addition of an alkaline precipitant (ammonium hydroxide) to an aqueous solution of a platinum salt, and thereafter admixing it with the alumina. The resulting mixture is then dried, calcined and the platinum reduced. These alumina-supported catalysts incorporate from about 0.01 to 5.0 percent by weight of platinum distributed on the surface of the alumina support, the latter generally having a high surface area exceeding 75 m.$^2$/g. In addition to the platinum component, the catalyst may also incorporate various halogens and other components known to improve the activity, selectivity, or other desired characteristic of the catalyst. Detailed methods of producing metallic platinum-alumina catalysts can be found, for example, in U.S. Patent 2,479,109 (Haensel) and U.S. Patents 2,838,444 and 2,838,445 (Teter et al.).

The platinum component of the catalyst (either in the metallic or oxide form) can be sulfided by contacting it with hydrogen sulfide or with hydrogen and a relatively low molecular weight mercaptan or organic sulfide at temperatures below about 800° F. Preferably, the sulfiding is done in situ in the reaction zone, and, if desired, the sulfide can be continuously or intermittently added to the zone along with the alkylbenzene feed and/or hydrogen.

The reaction conditions employed in the present process are maintained under superatmospheric total pressure, preferably from about 25 to 1500 p.s.i.g.; temperature from about 900° to 1250° F. and preferably from 1050° to 1200° F.; contact times, as measured in terms of liquid hourly space velocity (LHSV), from about 0.05 to 5.0 volumes of feed per volume of catalyst per hour (v./v./hr.); and at a hydrogen-to-alkylbenzene mol ratio of from about 1:1 to about 7:1, preferably from 2:1 to 5:1. With respect to the relationship of reaction temperature and feed contact time, when the former is at the higher end of the noted temperature range, the contact time should be shorter, i.e., the feed should be passed into the reactor at an LHSV approaching the higher end of the space velocity scale. At lower temperatures, the LHSV should also be low.

The following examples illustrate the process of the present invention, but are not intended to limit the same to the specific materials and conditions employed.

EXAMPLE 1

Reagent grade toluene, dried with a "molecular sieve," was contacted at a number of different temperatures with a commercial reforming catalyst [comprising approximately 0.75 percent platinum disposed on an alumina support containing about 0.35 chloride and 0.35 fluoride (all percentages are in weight percent based upon the total catalyst)] that had been sulfided in situ by contact with hydrogen sulfide in a hydrogen stream. For comparative purposes, a number of runs were made in identical manner except that the catalyst was not sulfided, the platinum being in the form of metallic platinum. All runs were made at a pressure of 24 p.s.i.g., a very short contact time of about 2.5 seconds, in the presence of added hydrogen. Table I shows the results of these runs at the indicated reaction temperatures.

*Table I*

| | Reaction Temperature, ° F. | | | | | | | |
|---|---|---|---|---|---|---|---|---|
| | 800 | 850 | 900 | 950 | 1,000 | 1,050 | 1,100 | 1,150 |
| Toluene Converted, Wt. Percent: | | | | | | | | |
| Sulfided Catalyst | 0 | | | | 4.8 | 10.7 | 29.5 | 66.5 |
| Non-sulfided Catalyst | 43.0 | 55.3 | 70.7 | 77.8 | 87.8 | 92.4 | 99.3 | 99.8 |
| Benzene Product, Wt. Percent: | | | | | | | | |
| Sulfided Catalyst | 0 | | | | 3.4 | 7.8 | 20.9 | 46.4 |
| Non-sulfided Catalyst | 18.3 | 23.1 | 23.6 | 29.4 | 27.4 | 29.4 | 23.0 | 20.4 |
| Methane Produced, Wt. Percent: | | | | | | | | |
| Sulfided Catalyst | 0 | | | | 0.8 | 2.0 | 7.4 | 20.1 |
| Non-sulfided Catalyst | 22.6 | 29.1 | 46.1 | 48.1 | 60.2 | 62.2 | 76.3 | 79.4 |
| Molar Yield of Benzene: | | | | | | | | |
| Sulfided Catalyst | 0 | | | | 85 | 86 | 84 | 82 |
| Non-sulfided Catalyst | 51 | 49 | 39 | 43 | 37 | 37 | 27 | 24 |

Under identical conditions, except for the form of the platinum on the catalyst, it can be seen from the table that the sulfided catalyst is superior for use in the hydrodealkylation of alkylbenzenes. This catalyst produces a higher amount of benzene (46.4 weight percent as compared to a maximum of 29.4 weight percent when using the non-sulfided catalyst) in a considerably higher molar yield (82 percent as compared to only 43 percent).

It might be noted that, under identical conditions, employing a catalyst composed of a silica gel support having 0.5 weight percent (as the metal) platinum sulfide disposed thereon, a maximum of only 3 weight percent benzene was produced over a range of reaction temperatures from 900° to 1150° F.

EXAMPLE 2

Three separate, continuous runs were made employing the same feed and sulfided catalyst described in Example 1. The reaction conditions and the average analysis of the liquid product for the recorded on-stream time is shown in Table II.

Table II

| Run No. | 38 | 39 | 40 |
|---|---|---|---|
| Feed | Toluene | Toluene | Toluene |
| Catalyst | Sulfided | Sulfided | Sulfided |
| Temperature, °F | 1,100 | 1,100 | 1,150 |
| Total Pressure, p.s.i.g. | 800 | 800 | 800 |
| LHSV | 1.0 | 0.5 | 1.0 |
| $H_2$:Hydrocarbon, mol. ratio | 3 | 3 | 3 |
| Liquid Product Analysis: | | | |
| Toluene, Wt. Percent | 60 | 44 | 31 |
| Xylene, Wt. Percent | 4 | 2 | 2 |
| Benzene, Wt. Percent | 36 | 54 | 67 |

From the data presented, it can be seen that, for the hydrodealkylation of alkylbenzenes, and particularly the most difficult alkylbenzene to dealkylate (toluene), a platinum sulfide, alumina catalyst is superior to either a metallic platinum-alumina or a platinum sulfide-silica gel catalyst.

I claim as my invention:

1. A process for the dealkylation of alkylbenzenes which comprises contacting said alkylbenzenes, along with from one to seven mols of hydrogen per mol of alkylbenzenes, with a catalyst consisting essentially of from 0.01 to 5.0 percent by weight (as the metal) of the total weight of said catalyst of platinum sulfide disposed on a halogen containing alumina support at a reaction temperature of from about 1050° to 1200° F. and at superatmospheric pressure.

2. The process of claim 1, wherein the alkylbenzene is toluene.

References Cited in the file of this patent
UNITED STATES PATENTS

| 2,734,929 | Doumani | Feb. 14, 1956 |
| 2,780,661 | Hemminger et al. | Feb. 5, 1957 |
| 2,960,545 | Seubold | Nov. 15, 1960 |